United States Patent [19]
Jou

[11] Patent Number: 5,497,395
[45] Date of Patent: Mar. 5, 1996

[54] METHOD AND APPARATUS FOR MODULATING SIGNAL WAVEFORMS IN A CDMA COMMUNICATION SYSTEM

[75] Inventor: Yu-Cheun Jou, San Diego, Calif.

[73] Assignee: Qualcomm Incorporated, San Diego, Calif.

[21] Appl. No.: 223,076

[22] Filed: Apr. 4, 1994

[51] Int. Cl.[6] ............................................. H04K 1/10
[52] U.S. Cl. ......................... 375/205; 375/200; 380/34; 370/18; 370/19
[58] Field of Search ........................ 380/34; 375/1; 370/18, 19

[56] References Cited

U.S. PATENT DOCUMENTS

| | | | |
|---|---|---|---|
| 3,678,204 | 7/1972 | Harmuth | 179/15 |
| 4,052,565 | 10/1977 | Baxter et al. | 178/1.5 |
| 4,460,992 | 7/1984 | Gutlebert | 370/19 |
| 4,494,228 | 1/1985 | Gutlebert | 370/18 |
| 5,103,459 | 4/1992 | Gilhousen et al. | 375/1 |
| 5,204,876 | 4/1993 | Bruckert et al. | 375/1 |
| 5,216,692 | 6/1993 | Ling | 375/1 |
| 5,235,614 | 8/1993 | Bruckert et al. | 375/1 |
| 5,267,271 | 11/1993 | Rice | 375/1 X |
| 5,297,161 | 3/1994 | Ling | 375/1 |
| 5,309,474 | 5/1994 | Gilhousen et al. | 375/1 |
| 5,329,547 | 7/1994 | Ling | 375/1 |
| 5,341,396 | 8/1994 | Higgins et al. | 375/1 |
| 5,359,624 | 10/1994 | Lee et al. | 375/1 |

*Primary Examiner*—David C. Cain
*Attorney, Agent, or Firm*—Russell B. Miller; Brian S. Edmonston

[57] ABSTRACT

An improved system and method for transmitting information within a digital communication system is disclosed herein. A modulation system for use in a digital cellular communication system is described in which information is exchanged among a plurality of mobile users, via at least one cell-site, using a set of orthogonal binary codes. The modulation system allows the information carrying capacity of signal transmission on the mobile-to-cell communication link, i.e., the "reverse" link, of the communication system to be significantly improved. The modulation system receives an input information signal an generates an orthogonal sequence signal in response thereto. The orthogonal sequence signal corresponds to a selected one of a plurality of orthogonal binary chip sequences derived from a set of orthogonal binary codes. The orthogonal binary sequences are constructed such that a selected chip at a predefined sequence position within each of the orthogonal binary sequences is of the same binary value. The selected orthogonal sequence signal is combined with a control signal to provide a punctured sequence signal. This combination is performed such that the punctured sequence signal includes a control chip at the predefined sequence position having a value determined by the control signal. The punctured sequence signal may then be transmitted via a carrier signal. In a particular spread spectrum implementation, the punctured sequence signal is combined with a pseudo-noise (PN) signal in order to generate a carrier modulation signal.

28 Claims, 6 Drawing Sheets

| WALSH SYMBOL INDEX | WALSH CHIP WITHIN SYMBOL |||||||||||||||||| |
|---|---|---|---|---|---|---|---|---|---|---|---|---|---|---|---|---|---|
| | 0123 | 4567 | 11<br>8901 | 1111<br>2345 | 1111<br>6789 | 2222<br>0123 | 2222<br>4567 | 2233<br>8901 | 3333<br>2345 | 3333<br>6789 | 4444<br>0123 | 4444<br>4567 | 4455<br>8901 | 5555<br>2345 | 5555<br>6789 | 6666<br>0123 |
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |

FIG. 4b

WALSH CHIP WITHIN SYMBOL

| | 0000000000111111111122222222223333333333444444444455555555556666 | | | | | | | | | | | | | | | |
|---|---|---|---|---|---|---|---|---|---|---|---|---|---|---|---|---|
| | 0123 | 4567 | 8901 | 2345 | 6789 | 0123 | 4567 | 8901 | 2345 | 6789 | 0123 | 4567 | 8901 | 2345 | 6789 | 0123 |
| 24 | 0000 | 0000 | 1111 | 1111 | 1111 | 1111 | 1111 | 1111 | 0000 | 0000 | 1111 | 1111 | 1111 | 1111 | 0000 | 0000 |
| 25 | 0101 | 0101 | 1010 | 1010 | 1010 | 1010 | 1010 | 1010 | 0101 | 0101 | 1010 | 1010 | 1010 | 1010 | 0101 | 0101 |
| 26 | 0011 | 0011 | 1100 | 1100 | 1100 | 1100 | 1100 | 1100 | 0011 | 0011 | 1100 | 1100 | 1100 | 1100 | 0011 | 0011 |
| 27 | 0110 | 0110 | 1001 | 1001 | 1001 | 1001 | 1001 | 1001 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 0000 | 0000 | 0000 | 1111 | 1111 | 1111 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |

WALSH SYMBOL INDEX

FIG. 4c

| WALSH SYMBOL INDEX | 0123 | 4567 | 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

WALSH CHIP WITHIN SYMBOL

FIG 5

METHOD AND APPARATUS FOR MODULATING SIGNAL WAVEFORMS IN A CDMA COMMUNICATION SYSTEM

BACKGROUND OF THE INVENTION

I. Field of the Invention

The present invention relates to communication systems, and, more particularly, to a novel and improved method and apparatus for communicating information in a spread spectrum communication system.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the signal reception location the original message signal is reproduced from the received modulated signal. Such reproduction is generally achieved by using an inverse of the modulation process employed by the source transmitter.

Modulation also facilitates multiple-access, i.e., the simultaneous transmission of several signals over a common channel. Multiple-access communication systems will often include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a frequency band wider than the bandwidth of the signal being transmitted. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

More particularly, communication in a CDMA system between a pair of locations is achieved by spreading each transmitted signal over the channel bandwidth by using a unique user spreading code. Specific transmitted signals are extracted from the communication channel by despreading the composite signal energy in the communication channel with the user spreading code associated with the transmitted signal to be extracted.

An improved method for communicating information signals in a spread spectrum communication system was disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", which is also assigned to the assignee of the present invention, and which is herein incorporated by reference. The CDMA system as disclosed in U.S. Pat. No. 5,103,459 (the '459 patent) contemplated spreading all signals transmitted by a cell or one of the sectors of the cell with an "outer" pseudonoise (PN) code for both the in-phase (I) and quadrature-phase (Q) channels. The signals were also spread with an inner orthogonal code generated by using Walsh functions. A signal addressed to a particular user was multiplied by the outer PN sequences and by a particular Walsh sequence, or sequence of Walsh sequences, assigned by the system controller for the duration of the user's telephone call. The same inner code was applied to both the I and Q channels resulting in a modulation which is effectively bi-phase for the inner code. Constructing PN sequences which are orthogonal reduces mutual interference between users, allowing higher capacity and better link performance.

It is well known in the art that a set of n orthogonal binary sequences, each of length n, for n any power of 2 can be constructed, see Digital Communications with Space Applications, S. W. Golomb et al., Prentice-Hall, Inc, 1964, pp. 45–64. In fact, orthogonal binary sequence sets are also known for most lengths which are multiples of four and less than two hundred. One class of such sequences that is easy to generate is called the Walsh functions.

A Hadamard matrix of order n can be defined recursively as follows:

$$H(n) = \begin{vmatrix} H(n/2), H(n/2) \\ H(n/2), H'(n/2) \end{vmatrix}$$

where H' denotes the logical complement of H, and H(1)= 0. Thus, $$H(2) = \begin{vmatrix} 0, 0 \\ 0, 1 \end{vmatrix} \text{ and}$$

$$H(4) = \begin{vmatrix} 0, 0, 0, 0 \\ 0, 1, 0, 1 \\ 0, 0, 1, 1 \\ 0, 1, 1, 0 \end{vmatrix}$$

H(8) is as follows:

$$H(8) = \begin{vmatrix} 0,0,0,0,0,0,0,0 \\ 0,1,0,1,0,1,0,1 \\ 0,0,1,1,0,0,1,1 \\ 0,1,1,0,0,1,1,0 \\ 0,0,0,0,1,1,1,1 \\ 0,1,0,1,1,0,1,0 \\ 0,0,1,1,1,1,0,0 \\ 0,1,1,0,1,0,0,1 \end{vmatrix}$$

A Walsh sequence is one of the rows of a Hadamard matrix. A Hadamard matrix of order n contains n sequences, each of length n bits.

A Walsh function of order n (as well as other orthogonal functions) has the property that the cross-correlation between all the different sequences within the set is zero, provided that the sequences are time aligned with each other. This can be seen by noting that every sequence differs from every other sequence in exactly half of its bits. It should also be noted that there is always one sequence containing all zeroes and that all the other sequences contain half ones and half zeroes.

Neighboring cells and sectors can reuse the Walsh sequences because the outer PN codes used in neighboring cells and sectors are distinct. Because of the differing propagation times for signals between a particular mobile's location and two or more different cells, it is not possible to satisfy the condition of time alignment required for Walsh function orthogonality for both cells at all times. Thus, reliance must be placed on the outer PN code to provide discrimination between signals arriving at the mobile unit from different cells. However, all the signals transmitted by a cell are orthogonal to each other and thus do not contribute interference to each other. This eliminates the majority of the interference in most locations, allowing a higher capacity to be obtained.

In the system of the '459 patent Walsh functions were also employed to encode the channel data signals transmitted over both the cell-to-mobile link (i.e., the "forward" link) and the mobile-to-cell link (i.e., the "reverse" link). In the exemplary forward link numerology as disclosed therein, a total of 64 different Walsh sequences were available with three of these sequences dedicated to the pilot, sync and paging channel functions. In the sync, paging and voice channels, input data was convolutionally encoded and then interleaved as is well known in the art. Furthermore, the convolutional encoded data was also provided with repetition before interleaving as is also well known in the art.

A similar 64-ary orthogonal signaling technique using Walsh functions is described with reference to the reverse link of the system of the '459 patent. The message encoding and modulation process on the reverse link begins with a convolutional encoder of constraint length K= 9 and code rate r= ⅓. At a nominal data rate of 9600 bits per second, the encoder produces 28800 binary symbols per second. These are grouped into characters containing 6 symbols each at a rate of 4800 characters per second with there being 64 possible characters. Each character is encoded into a length 64 Walsh sequence containing 64 binary bits or "chips."

The encoding method described with reference to the reverse link is, however, less than optimal in that certain information is redundantly carried by each 64 chip Walsh sequence. It is therefore an object of the invention to provide a Walsh encoding technique which improves information carrying capacity by reducing such redundant information transmission.

SUMMARY OF THE INVENTION

The present invention provides an improved system and method for transmitting information within a digital communication system. In an exemplary embodiment, the present invention is directed to a modulation system for use in a digital cellular communication system in which information is exchanged among a plurality of mobile users, via at least one cell-site, using a set of orthogonal binary codes.

The present invention contemplates improving the information carrying capacity of signal transmission on the mobile-to-cell communication link, i.e., the "reverse" link, an involves generating an orthogonal sequence signal based on the value of a data signal. The orthogonal sequence signal corresponds to a selected one of a plurality of orthogonal binary chip sequences derived from a set of orthogonal binary codes. In a preferred embodiment the orthogonal binary sequences are constructed such that a selected chip at a predefined sequence position within each of the orthogonal binary sequences is of the same binary value.

In accordance with the invention, the orthogonal sequence signal is combined with a control signal to provide a punctured sequence. This combination is performed such that the punctured sequence includes a control chip at the predefined sequence position having a value determined by the control signal. The punctured sequence may then be transmitted via a carrier signal. In a particular spread spectrum implementation, the punctured sequence signal is combined with a pseudo-noise (PN) signal in order to generate a carrier modulation signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4a–c sets forth the set of code symbols corresponding to a set of 64 orthogonal Walsh code sequences.

DETAILED DESCRIPTION OF THE PREFERRED EMBODIMENTS

I. System Overview

Figure 1:
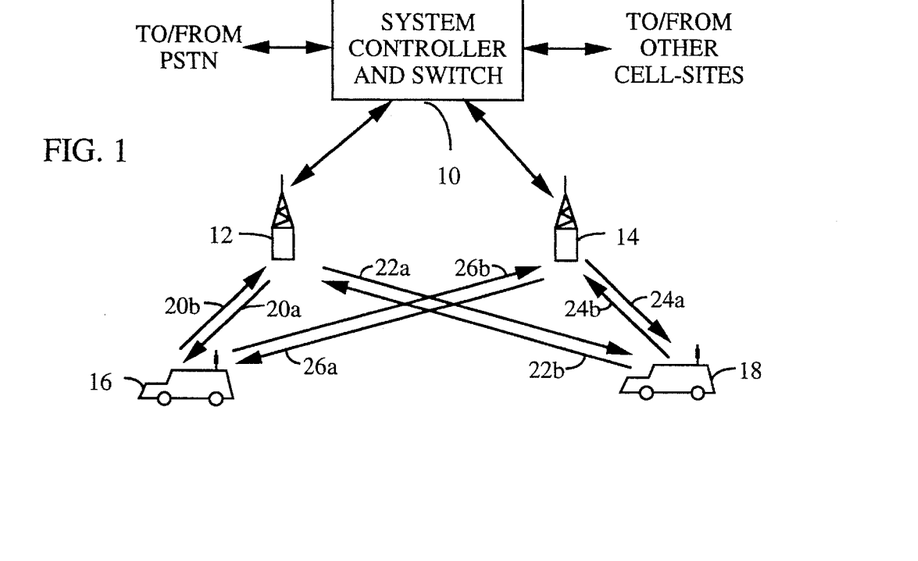
FIG. 1 is a schematic overview of an exemplary CDMA cellular communication system.

An exemplary cellular subscriber communication system in which the present invention may be embodied is illustrated in FIG. 1. The system of FIG. 1 utilizes spread spectrum modulation techniques in communication between users of the mobile units (e.g., mobile telephones), and the cell-sites. In FIG. 1, system controller and switch 10 typically includes interface and processing circuitry for providing system control to the cell-sites. When the system of FIG. 1 is configured to process telephone calls, controller 10 operates to route telephone calls from the public switched telephone network (PSTN) to the appropriate cell-site for transmission to the appropriate mobile unit. In this instance controller 10 also functions to route calls from the mobile units, via at least one cell-site, to the PSTN. Controller 10 may connect calls between mobile users via the appropriate cell-sites since the mobile units do not typically communicate directly with one another.

Controller 10 may be coupled to the cell-sites by various means such as dedicated telephone lines, optical fiber links or microwave communication links. In FIG. 1, two such exemplary cell-sites 12 and 14, along with mobile units 16 and 18, are illustrated. Cell-sites 12 and 14 as discussed herein and illustrated in the drawings are considered to service an entire cell. However it should be understood that the cell may be geographically divided into sectors with each sector treated as a different coverage area. Accordingly, handoffs are made between sectors of a same cell as is described herein for multiple cells, while diversity may also be achieved between sectors as is for cells.

In FIG. 1, arrowed lines 20a–20b and 22a–22b respectively define the possible communication links between cell-site 12 and mobile unit 16 and 18. Similarly, arrowed lines 24a–24b and 26a–26b respectively define the possible communication links between cell-site 14 and mobile units 16 and 18. Cell-sites 12 and 14 nominally transmit using equal power.

The cell-site service areas or cells are designed in geographic shapes such that the mobile unit will normally be closest to one cell-site, and within one cell sector should the cell be divided into sectors. When the mobile unit is idle, i.e. no calls in progress, the mobile unit constantly monitors the pilot signal transmissions from each nearby cell-site, and if applicable from a single cell-site in which the cell is sectorized. As illustrated in FIG. 1, the pilot signals are respectively transmitted to mobile unit 16 by cell-sites 12 and 14 upon outbound or forward communication links 20a and 26a. Mobile unit 16 can determine which cell it is in by comparing signal strength in pilot signals transmitted from cell-sites 12 and 14.

As is described in further detail below with reference to FIG. 3, voice transmission by each mobile unit is initiated by providing the mobile user analog voice signal to a digital vocoder. The vocoder output is then, in sequence, convolutional forward error correction (FEC) encoded, 64-ary orthogonal sequence encoded and modulated on a PN carrier signal. The 64-ary orthogonal sequence is generated by a Walsh function encoder. The encoder is controlled by collecting six successive binary symbol outputs from the convolutional FEC encoder. The six binary symbol outputs collectively determine which of the 64 possible Walsh sequences will be transmitted. The Walsh sequence is 64 bits long. Thus, the Walsh "chip" rate must be 9600 * 3 * (½) * 64=307200 Hz for a 9600 bps data transmission rate.

In the mobile-to-cell link (i.e., the "reverse" link) a common short PN sequence is used for all voice carriers in the system, while user address encoding is done using the user PN sequence generator. The user PN sequence is uniquely assigned to the mobile for at least the duration of each call. The user PN sequence is exclusive-OR'ed with the common PN sequences, which are length 32768 augmented maximal linear shift register sequences. The resulting binary signals then each bi-phase modulate a quadrature carrier, are summed to form a composite signal, are bandpass filtered, and translated to an IF frequency output. In the exemplary embodiment, a portion of the filtering process is actually carried out by a finite impulse response (FIR) digital filter operating on the binary sequence output.

The modulator output is then power controlled by signals from the digital control processor and the analog receiver, converted to the RF frequency of operation by mixing with a frequency synthesizer which tunes the signal to proper output frequency, and then amplified to the final output level. The transmit signal is then passed on to a duplexer and an antenna. Although the manner in which the present invention may be embodied within the spread spectrum communication system of FIG. 1 is discussed in detail below in connection with FIGS. 3–5, the principles of the invention are first described with reference to the generalized representation of a digital communication system depicted in FIGS. 2A and 2B.

II. Reverse Link Data Transmission

Figure 2A:
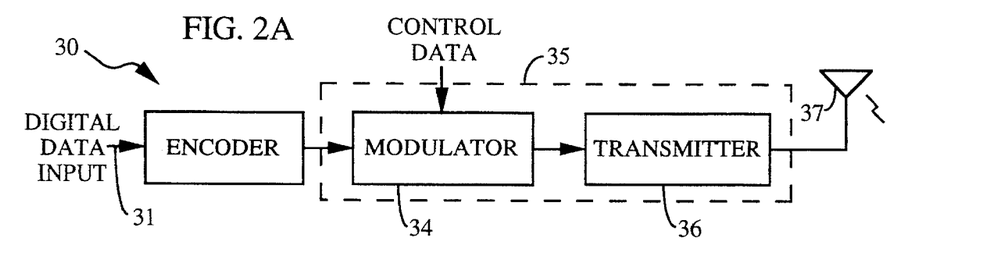
FIG. 2A illustrates a preferred implementation of a mobile unit transmit modulator in accordance with the invention.

FIG. 2A illustrates a preferred implementation of a mobile unit transmit modulator 30 in accordance with the invention. Data is provided in digital form from via input line 31 to an encoder 33, which is disposed to generate a code sequence output. In the preferred embodiment a 64-ary orthogonal signaling technique is utilized by the encoder to encode the input digital data. In 64-ary orthogonal signaling a set of 64 possible characters is available for data encoding, with each character being encoded into a length 64 sequence containing 64 binary bits or "chips". It is characteristic of 64-ary signaling that at least one chip of each orthogonal 64 chip sequence (e.g., Walsh sequence) is identical. As is described hereinafter, the present invention utilizes the identical chip of each sequence to transmit information over a "subchannel" ancillary to the communication channel over which is transmitted the input digital data.

Referring to FIG. 2A, the encoded data from encoder 33 is provided to one input of a modulator circuit 34 included within transmit modulator 35. The modulator circuit also receives a stream of sub-channel control data, which is combined with the data produced by the encoder 33, by overwriting the same chip within each code sequence. In accordance with the invention, this "puncturing" of the code sequence is performed in a manner which permits the control data to be transmitted without loss of information. More specifically, the present invention makes use of the fact that the first chip of each of each orthogonal Walsh sequence of order "n" is identical. It follows that a single bit of control data may be carried by each code sequence by overwriting the first chip. Modulator circuit 34, on the basis of timing information provided by a mobile unit microprocessor (not shown), replaces the first chip within each code sequence with a single bit of control data to be transmitted over the control sub-channel. In an exemplary embodiment the control sub-channel is utilized to send power control data to the cell-site, where such power control data is indicative of the level of power received by a given mobile unit.

Figure 2B:
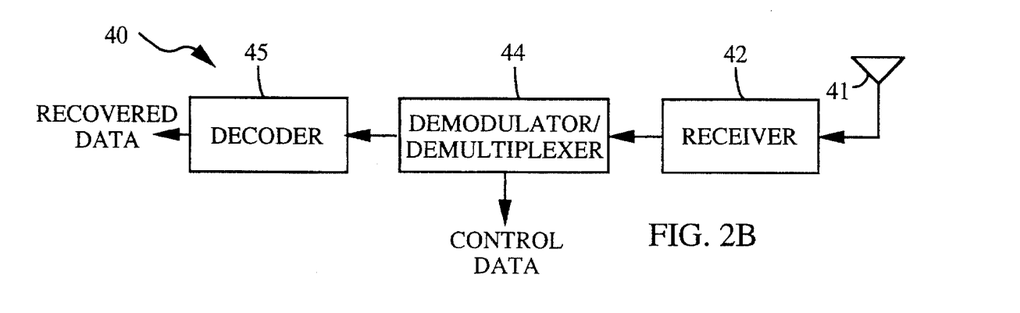
FIG. 2B shows a block diagram of a cell-site receiver of the invention operative to receive mobile unit transmissions.

As is indicated by FIG. 2A, the transmit modulator 35 also includes a transmitter 36 coupled to the modulator circuit 34. A carrier signal generated within the transmitter 36 is modulated by the punctured sequence output by the modulator circuit. The resulting modulated carrier is then transmitted via antenna 37 to a cell-site station 40 (FIG. 2B). In an exemplary embodiment the information transmitted on the control sub-channel is extracted from the signal received at the cell-site in the manner described below with reference to FIG. 2B.

III. Reverse Link Data Reception

Referring to FIG. 2B, there is shown a block diagram of a cell-site receiver 40 operative to receive transmissions from the mobile units deployed within an associated cell or sector. Signals transmitted by mobile units and received on antenna 41 are provided to analog receiver 42. Within receiver 42 the signals received from the antenna 41 are amplified, downconverted to an intermediate frequency, bandpass filtered, and sampled by an analog to digital converter.

The digitized output from the receiver 42 is seen to be provided to demodulator/demultiplexer 44. Based on timing information provided by the cell-site control processor (not shown), the demodulator/demultiplexer 44 identifies the first chip of each received code sequence and compares the identified value to a predefined threshold. Based on this comparison the demodulator/demultiplexer 44 assigns a logical value to the first chip within each sequence, thereby determining the values of each bit of control data received over the control sub-channel. As is indicated by FIG. 2B, the control sub-channel data extracted by demodulator/demultiplexer 44 is then provided as control data to the cell-site control processor.

The digital code sequences generated within demodulator/demultiplexer 44 in response to the received signal energy are provided to a decoder 45 operative to identify the orthogonal code sequences transmitted by a particular mobile unit. That is, the decoder 45 recovers the input digital data transmitted by the transmit modulator 30 (FIG. 2A) and provides the result to the cell-site control processor.

In an alternate embodiment one or more other receiver systems (not shown) is employed to process the energy received over one or more other corresponding signal propagation paths. The recovered data output from each such receiver system is collectively provided to "diversity" combiner and decoder circuitry. Such circuitry is operative to combine the recovered data from each receiver based on the strength of the signal energy received over each signal propagation path. A detailed description of an exemplary spread spectrum diversity receiver system is described below in section V.

IV. Reverse Link Spread Spectrum Data Transmission

Figure 3:
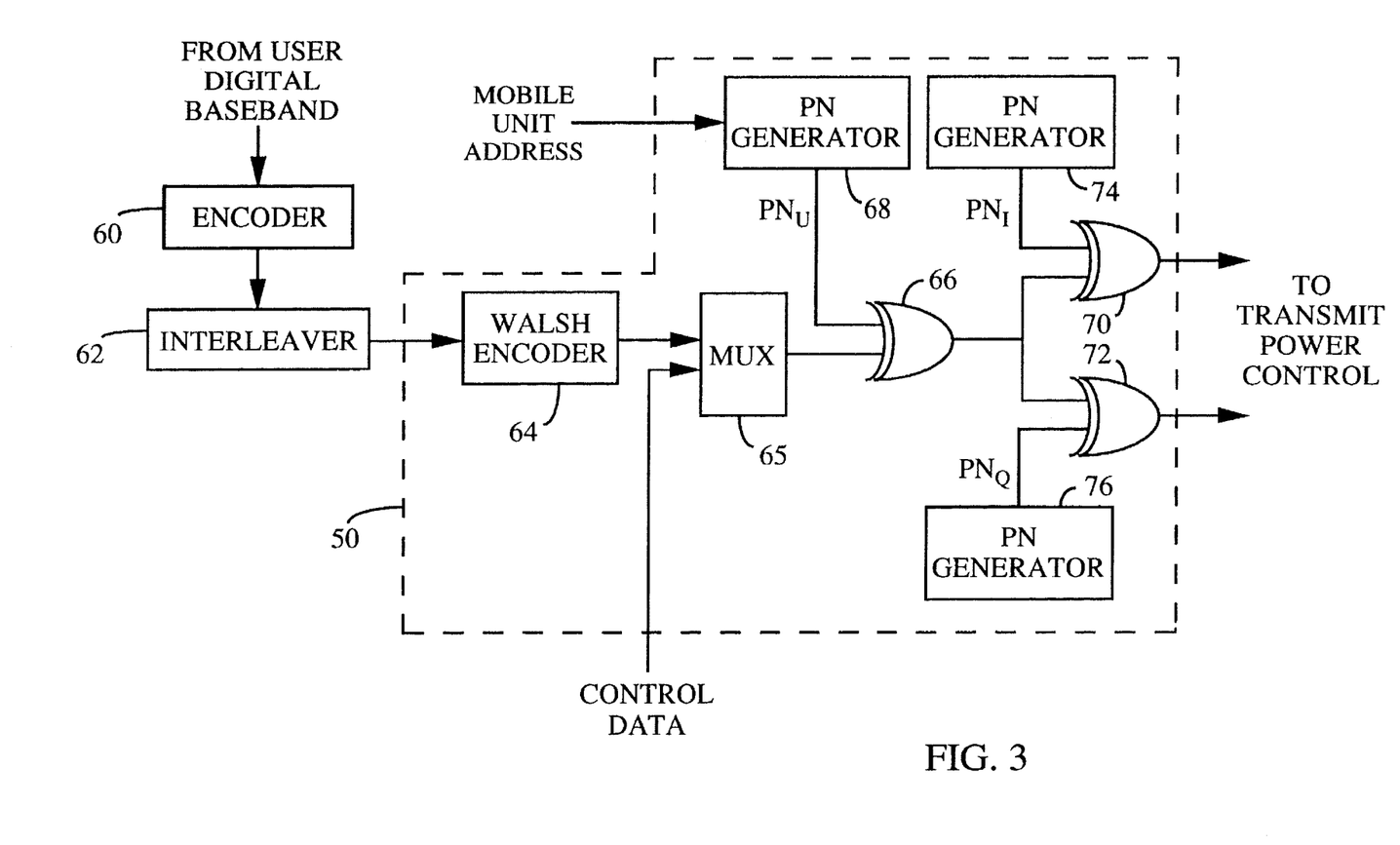
FIG. 3 illustrates a preferred implementation of a mobile unit transmit modulator.

FIG. 3 illustrates a preferred implementation of a mobile unit transmit modulator 30. Data is provided in digital form from the user digital baseband circuitry to encoder 60 where in the exemplary embodiment it is convolutionally encoded. The output of encoder 60 is provided to interleaver 62 which in the exemplary embodiment is a block interleaver. The interleaved symbols are output from block interleaver 62 to Walsh encoder 64 of transmit modulator 50. Walsh encoder 64 utilizes the input symbols to generate a code sequence output. The Walsh sequence is provided to one input of multiplexer 65. As is described hereinafter, the multiplexer 65 also receives a stream of control data which is combined with the data produced by Walsh encoder 64 by overwriting selected Walsh chips within the output code sequence. In accordance with the invention, this "puncturing" of the code sequence is performed in a manner which permits the control data to be transmitted without loss of voice information. More specifically, the present invention makes use of the fact that the first chip of each of "n" Walsh sequence of order "n" is identically zero. It follows that a single bit of control data may be carried by each Walsh sequence by overwriting the first Walsh chip of each sequence.

Figure 4B:
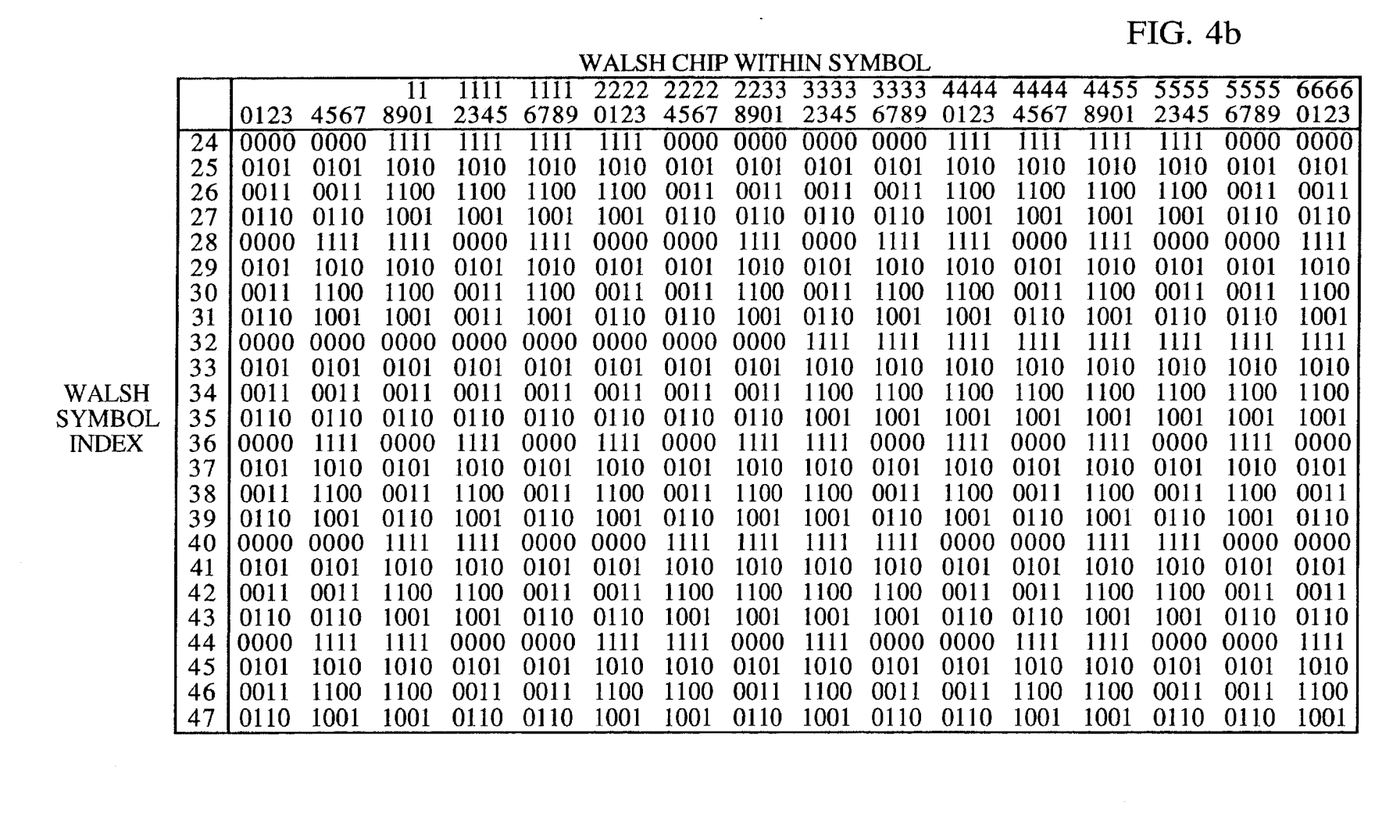
Figure 4C:
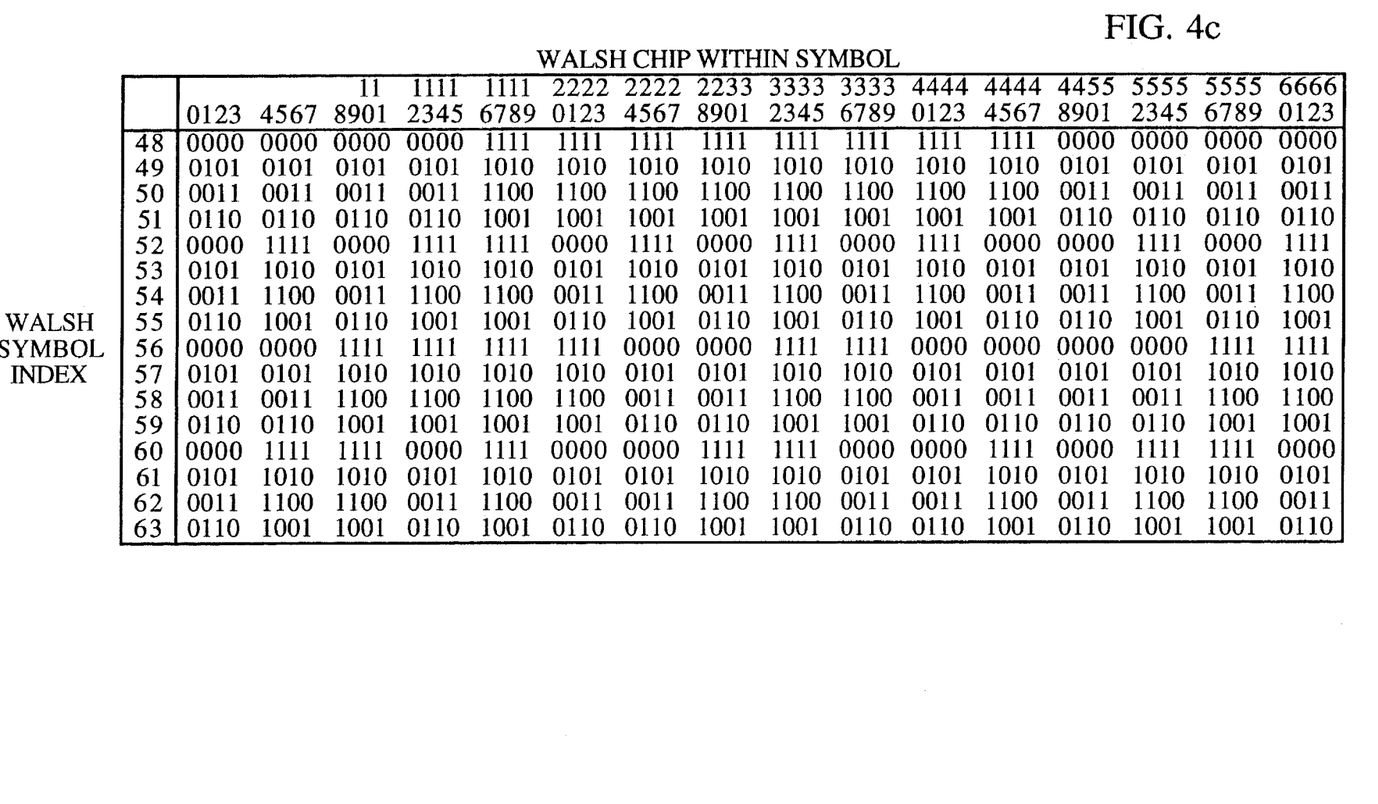

As noted above, in an exemplary implementation an accumulated set of six binary symbols determines which of the 64 possible Walsh sequences of length 64 Walsh chips are produced by Walsh encoder 64. FIG. 4 sets forth the set of code symbols corresponding to this set of 64 orthogonal Walsh sequences. As is evident upon inspection of FIGS. 4a–c, the first Walsh chip within each Walsh sequence of length 64 consists of logical zero. Multiplexer 65, on the basis of timing information provided by a mobile unit microprocessor (not shown), replaces the first Walsh chip within each Walsh sequence with a single bit of control data to be transmitted over the control sub-channel. In an exemplary embodiment, the control sub-channel is utilized to send power control data to the cell-site, where such power control data is indicative of the level of power received by a given mobile unit. One method of extracting the information transmitted on the control sub-channel of a given mobile unit from the encoded mobile unit voice data received at the cell-site is described below with reference to FIG. 5.

It is anticipated that the control sub-channel could also be employed to facilitate acquisition and tracking of the PN spreading code received at the cell-site from the mobile unit. Specifically, if each bit of control data is uniformly selected to be zero, then the first Walsh chip of each "punctured" Walsh sequence obtained by modulating the code sequence with the control data will also be identically zero. This result follows since, as noted above, the first Walsh chip within each Walsh sequence consists of a logical zero. Since a set of four PN chips are used to modulate Walsh each chip, the four PN chips associated with the first Walsh chip of each Walsh code sequence will therefore be "transparent" to the cell-site. That is, by selecting each bit of the control data to be uniformly zero the values of the first 4 of the 256 PN chips utilized to modulate each 64-chip Walsh sequence may be viewed at the cell-site. Knowledge of the first four PN chips associated with each Walsh sequence aids in, for example, PN code acquisition and/or tracking by enabling synchronization of the PN code generated within the cell-site with the PN code received from a given mobile unit.

Turning again to FIG. 3, the punctured sequence output by multiplexer 65 is provided to one input of exclusive-OR gate 66. Transmit modulator 50 also includes PN generator 68, which receives the mobile unit address as an input in determining the output PN sequence. In an exemplary embodiment PN generator 68 generates a user PN sequence specifically identifying the mobile unit. A further attribute of PN generator 68, that is common to the PN generators of each mobile unit, is the use of a masking technique in generating the output user PN sequence. For example, a 42-bit mask is provided for that user with each bit of the 42-bit mask AND'ed with a bit output from each register of the shift registers that form the PN generator. The results of the mask and shift register bit AND operation are then exclusive-OR'ed together to form the PN generator output that is used as the user PN sequence. The output PN sequence of PN generator 68, the sequence $PN_U$, is input to exclusive-OR gate 66. The punctured Walsh sequence representative of the mobile unit voice and control data is exclusive-OR'ed with the $PN_U$ sequence in exclusive-OR gate 66 and provided as an input to both of exclusive-OR gates 70 and 72.

Transmit modulator 50 further includes PN generators 74 and 76 which respectively generate $PN_I$ and $PN_Q$ sequences. All mobile units use the same $PN_I$ and $PN_Q$ sequences, which are respectively associated with the In-Phase (I) and Quadrature-Phase (Q) communication channels. The other inputs of exclusive-OR gates 70 and 72 are respectively provided with the $PN_I$ and $PN_Q$ sequences output from PN generators 74 and 76. The sequences $PN_I$ and $PN_Q$ are exclusive-OR'ed in the respective exclusive-OR gates, with the output being provided to a mobile unit transmit power control network (not shown).

In the exemplary embodiment, the reverse link uses rate r= ⅓ convolutional code with constraint length K= 9. The generators for the code are G1= 557 (octal), G2= 663 (octal), and G3= 711 (octal). Code repetition is used to accommodate four different data rates produced by the vocoder on a 20 msec frame basis. However, the repeated code symbols are not transmitted over the air at lower energy levels, rather only one code symbol of a repetition group is transmitted at the nominal power level. In conclusion, the code repetition in the exemplary embodiment is used merely as an expedient to fit the variable data rate scheme in the interleaving and modulation structure as it will be shown in the following paragraphs.

A block interleaver spanning 20 msec, exactly one vocoder frame, is used on the reverse link. The number of code symbols in 20 msec, assuming a data rate of 9600 bps and a code rate r=⅓, is 576. The code symbols are written into the interleaver memory array by rows and read out by columns. As noted above, the modulation format is 64-ary orthogonal signalling. In other words, the interleaved code symbols are grouped into groups of six to select one out of 64 orthogonal waveforms.

The data modulation time interval is equal to 208.33 sec, and is referred to as a Walsh symbol interval. At 9600 bps, 208.33 sec corresponds to 2 information bits and equivalently to 6 code symbols at a code symbol rate equal to 28800 sps. The Walsh symbol interval is subdivided into 64 equal length time intervals, referred to as Walsh chips, each lasting 208.33/64= 3.25 sec. The Walsh chip rate is then 1/3.25 sec= 307.2 kHz. For an exemplary PN spreading rate of 1.2288 MHz, there are exactly 4 PN chips per Walsh chip.

V. Reverse Link Spread Spectrum Data Reception

Figure 5:
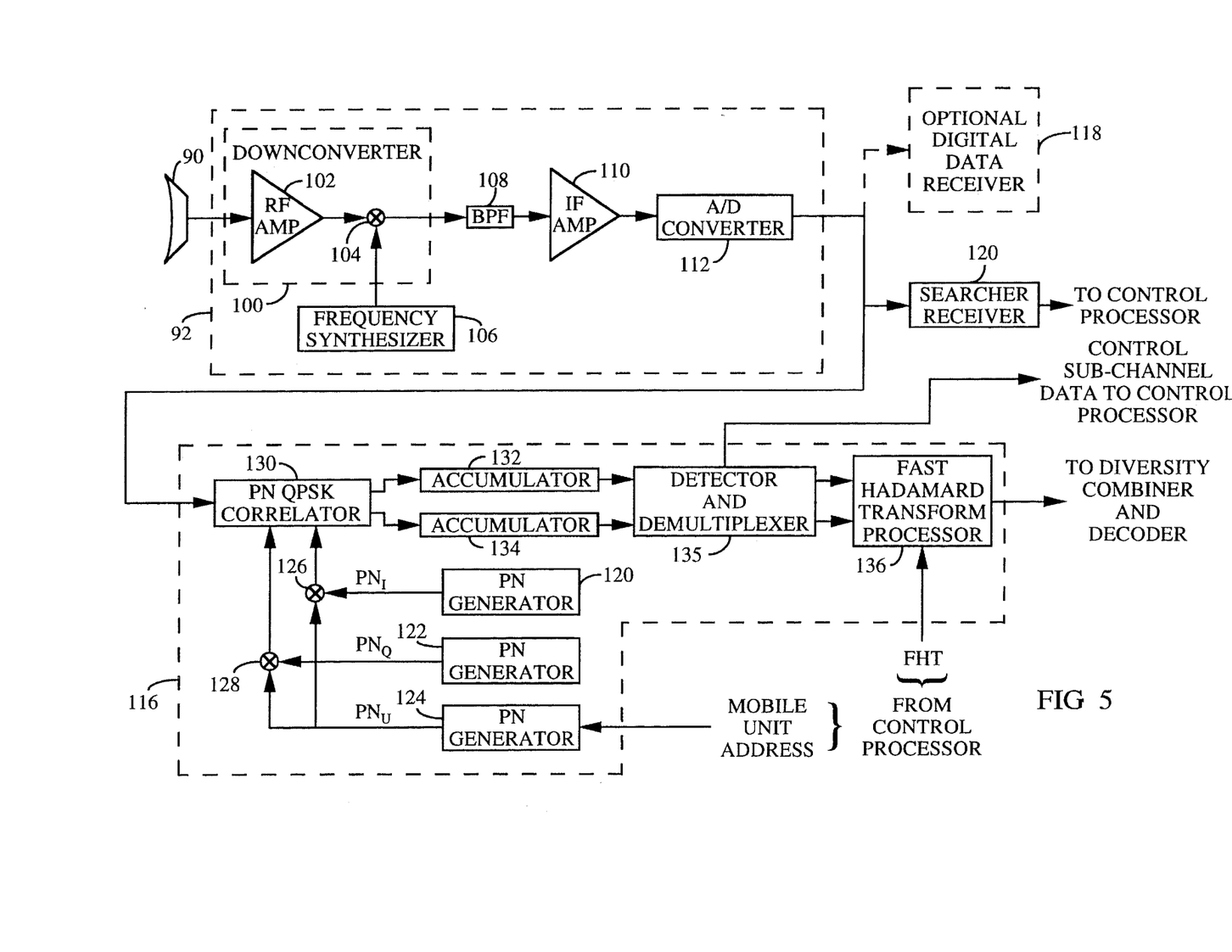
FIG. 5 is a block diagram of a spread spectrum cell-site receiver.

Referring to FIG. 5, there is shown a block diagram of a cell-site receiver operative to receive transmissions from the mobile units deployed within an associated cell or sector. Signals transmitted by mobile units and received on antenna 90 are provided to analog receiver 92, which is seen to include a downconverter 100. Downconverter 100 is comprised of RF amplifier 102 and mixer 104. The received signals are provided as an input to RF amplifier 102 where they are amplified and output to an input to mixer 104. Mixer 104 is provided another input, that being the output from frequency synthesizer 106. The amplified RF signals are translated in mixer 104 to an IF frequency by mixing with the frequency synthesizer output signal.

The IF signals are then output from mixer 104 to bandpass filter (BPF) 108, typically a Surface Acoustic Wave (SAW) filter having a passband of 1.25 MHz, where they are bandpass filtered. The filtered signals are output from BPF 108 to IF amplifier 110 where the signals are amplified. The amplified IF signals are output from IF amplifier 110 to analog to digital (A/D) converter 112 where they are digitized at a 9.8304 MHz clock rate which is exactly 8 times the PN chip rate. Although A/D converter 112 is illustrated as part of receiver 92, it could instead be a part of the data and searcher receivers. The digitized IF signals are output from (A/D) converter 112 to data receiver 116, optional data receiver 118 and searcher receiver 120. The signals output from receiver 92 are I and Q channel signals derived from mobile unit transmissions over the I and Q channels.

Although as illustrated in FIG. 5 with A/D converter 112 being a single device, with later splitting of the I and Q channel signals, it is envisioned that channel splitting may be done prior to digitizing with two separate A/D converters provided for digitizing the I and Q channels. Schemes for the RF-IF-Baseband frequency downconversion and analog to digital conversion for I and Q channels are well known in the art.

On the reverse link, the mobile unit does not transmit a pilot signal that can be used for coherent reference purposes in signal processing at the cell-site. Rather, in the 64-ary orthogonal signaling process employed on the reverse link the mobile unit transmitted symbols are encoded into one of 64 different binary sequences. The set of sequences chosen are known as Walsh functions. The optimum receive function for the Walsh function m-ary signal encoding is the Fast Hadamard Transform (FHT).

As is indicated by FIG. 5, searcher receiver 120 receives the signals output from analog receiver 92. The searcher receiver 120 is used at the cell-site to scan the time domain about the received signal to ensure that the associated digital data receiver 116, and data receiver 118 if used, are tracking and processing the strongest available time domain signal. The searcher receiver 120 provides a signal to a control processor within controller 10, which in turn generates signals used by digital data receivers 116 and 118 for selecting the appropriate received signal for processing. In order to decode the spread spectrum signals transmitted to the particular cell-site receiver through which the mobile unit communicates, the proper PN sequences must be generated. Further details on the generation of the mobile unit signals are discussed later herein.

In FIG. 5 optional digital data receiver 118 may be included for improved performance of the system. The structure and operation of this receiver is similar to that described below with reference to the data receiver 116. Receiver 118 may be utilized at the cell-site to obtain additional diversity modes. This additional data receiver alone or in combination with additional receivers can track and receive other possible delay paths of mobile unit transmitted signals. Optional additional digital data receivers such as receiver 118 provide additional diversity modes which are extremely useful in those cell-sites which are located in dense urban areas where many possibilities for multipath signals occur.

As illustrated in FIG. 5, receiver 116 includes two PN generators, PN generators 120 and 122, which generate two different short code PN sequences of the same length. These two PN sequences are common to those of all cell-site receivers and all mobile units with respect to the outer code of the modulation scheme as discussed in further detail later herein. PN generators 120 and 122 thus respectively provide the output sequences, $PN_I$ and $PN_Q$. The $PN_I$ and $PN_Q$ sequences are respectively referred to as the In-Phase (I) and Quadrature (Q) channel PN sequences.

The two PN sequences, $PN_I$ and $PN_Q$, are generated by different polynomials of degree 15, augmented to produce sequences of length 32768 rather than 32767 which would normally be produced. For example, the augmentation may appear in the form of the addition of a single zero to the run of fourteen 0's in a row which appears one time in every maximal-length linear feedback shift register of degree 15. In other words, one state of the PN generator would be repeated in the generation of the sequence. Thus the modified sequence contains one run of fifteen 1's and one run of fifteen 0's. Such a PN generator circuit is disclosed in U.S. Pat. No. 5,228,054, entitled "POWER OF TWO LENGTH PSEUDO-NOISE SEQUENCE GENERATOR WITH FAST OFFSET ADJUSTMENTS", which is assigned to the assignee of the present invention.

In the exemplary embodiment receiver 116 also includes a long code PN generator 124 which generates a $PN_U$ sequence corresponding to a PN sequence generated by the mobile unit in the mobile-to-cell (i.e., the reverse) link. PN generator 124 can be a maximal-length linear feedback shift register that generates a user PN code that is very long (e.g., $2^{42}-1$), time shifted in accordance with an additional factor such as the mobile unit address or user ID to provide discrimination among users. Thus the cell-site received signal is modulated by both the long code PNU sequence and the short code $PN_I$ and $PN_Q$ sequences. In the alternative, a non-linear encryption generator, such as an encryptor using the data encryption standard (DES) to encrypt a 64-symbol representation of universal time using a user specific key, may be utilized in place of PN generator 124.

The $PN_U$ sequence output from PN generator 124 is exclusive-OR'ed with the $PN_I$ and $PN_Q$ sequences respectively in exclusive-OR gates 126 and 128 to provide the sequences $PN_I'$ and $PN_Q'$.

The sequences $PN_I'$ and $PN_Q'$ are provided to PN QPSK correlator 130 along with the I and Q channel signals output from receiver 92. Correlator 130 is utilized to correlate the I and Q channel data with the $PN_I'$ and $PN_Q'$ sequences. The correlated I and Q channel outputs of correlator 130 are respectively provided to accumulators 132 and 134 where the symbol data is accumulated over a period of four PN chips. Again, in the exemplary embodiment the use of a PN spreading rate of 1.2288 MHz results in the existence of exactly 4 PN chips per Walsh chip. It follows that the periodic outputs of accumulators 132 and 134 correspond to successive Walsh chips within the received Walsh sequence.

The outputs of accumulators 132 and 134 are provided as inputs to a detector/demultiplexer 135. Based on timing information provided by the cell-site control processor, the detector/demultiplexer 135 identifies the outputs from accumulators 132 and 134 corresponding to the first Walsh chip of each 64-chip Walsh sequence. The accumulator outputs corresponding to the first Walsh chip are then combined, and the result compared with a predefined threshold. Based on this comparison detector/demultiplexer 135 makes a "hard" decision as to the logical value of the first Walsh chip within each Walsh sequence. The result of each such hard decision determines the value of the control data bit carried by the received Walsh sequences. As is indicated by FIG. 5, the control sub-channel data extracted by detector/demultiplexer 135 is then provided to the cell-site control processor.

The outputs of accumulators 132 and 134 corresponding to the remaining 63 Walsh chips of each Walsh sequence are forwarded by detector/demultiplexer 135 to a Fast Hadamard Transform (FHT) processor 136. FHT processor 136 produces a set of 64 coefficients for every 6 symbols. Each one of the 64 coefficients is representative of the energy of a corresponding one of the 64 Walsh functions. The output from FHT 136 is provided to diversity combiner and decoder circuity (not shown) operative to identify which one of 64 Walsh functions of length 64 has been received from a given mobile unit.

One or more other receiver systems (not shown) may also be employed to process the received signals in a manner similar to that discussed with respect to the first receiver system of FIG. 5. The weighted 64 symbols output from receiver 116 and the one or more other receiver systems are collectively provided to diversity combiner and decoder circuitry. The decoder circuitry will preferably include an adder which adds the weighted 64 coefficients from receiver 116 to the weighted 64 coefficients from any other receiver systems utilized. The resulting 64 coefficients are compared with one another in order to determine the largest coefficient. The magnitude of the comparison result, together with the identity or the largest of the 64 coefficients, is used to determine a set of decoder weights and symbols for use within a Viterbi algorithm decoder.

The Viterbi decoder (not shown) is of a type capable of decoding data encoded at the mobile unit with a constraint length K= 9, and of a code rate r= ⅓. Periodically, nominally 1.25 msec, a signal quality estimate is obtained and transmitted as a mobile unit power adjustment command along with data to the mobile unit. This quality estimate is the average signal-to-noise ratio over the 1.25 msec interval.

Each data receiver tracks the timing of the received signal it is receiving. This is accomplished by the well known technique of correlating the received signal by a slightly early local reference PN and correlating the received signal with a slightly late local reference PN. The difference between these two correlations will average to zero if there is no timing error. Conversely, if there is a timing error, then this difference will indicate the magnitude and sign of the error and the receiver's timing is adjusted accordingly.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A modulation system for use in spread spectrum communications, comprising:

means for receiving an input signal and for generating, in accordance with a value of said input signal, a first orthogonal sequence signal corresponding to one of a plurality of orthogonal binary chip sequences, each of said orthogonal binary chip sequences having a selected chip of an identical binary value located at an identical predefined sequence position;

means for combining said first orthogonal sequence signal with a control signal to generate a first punctured sequence signal, said punctured sequence signal including a control chip at said predefined sequence position having a binary value corresponding to said control signal;

means for generating a pseudo-noise (PN) signal corresponding to a predetermined PN binary sequence; and means for combining said first punctured sequence signal and said PN signal and for providing a resultant first modulation signal.

2. The system of claim 1 wherein said plurality of orthogonal binary sequences are Walsh sequences.

3. The system of claim 2 wherein said selected chip at said predefined sequence position corresponds to a first chip of each of said Walsh sequences.

4. A spread spectrum communication system including a modulator for modulating a digital user information signal for transmission over a communication channel, said modulator comprising:

orthogonal sequence generator means for receiving said user information signal and for generating, in accordance with a value of said user information signal, a preselected Walsh sequence included within a set of orthogonal Walsh binary sequences, each of said orthogonal binary chip sequences having a selected chip of an identical binary value located at an identical predefined sequence position;

means for combining said preselected Walsh sequence signal with a control signal to generate a first punctured sequence signal, said punctured sequence signal including a control chip at said predefined sequence position having a binary value corresponding to said control signal;

pseudorandom noise (PN) generator means for generating first and second PN signals of a code sequence different from one another; and combiner means for receiving and combining said punctured sequence signal respectively with said first and second PN signals, and providing resultant first and second output modulation signals.

5. The system of claim 4 further comprising transmission means for modulating said first and second output modulation signals upon a carrier signal and transmitting said modulated carrier signal.

6. The system of claim 5 further including receiver means for receiving said modulated carrier signal and means for extracting said control signal therefrom.

7. The system of claim 6 wherein said receiver means further includes demodulator means for demodulating said modulated carrier signal using said preselected Walsh sequence.

8. The system of claim 7 wherein said demodulator means further includes means for generating a first despreading signal by replicating said first PN signal, and means for correlating said modulated carrier signal using said first despreading signal so as to provide a first correlated output signal.

9. The system of claim 8 wherein said demodulator means further includes means for generating a second despreading signal by replicating said second PN signal, and means for correlating said modulated carrier signal using said second despreading signal to provide a second correlated output signal.

10. The system of claim 9 wherein said means for extracting said control signal includes means for combining said first and second correlated output signals.

11. A method for modulating a spread spectrum information signal, comprising the steps of:

generating, in accordance with a value of said information signal, a first orthogonal sequence signal corresponding to a selected one of a plurality of orthogonal binary chip sequences, each of said orthogonal binary chip sequences having a selected chip of a common predefined binary value located at a common predefined sequence position;

combining said first orthogonal sequence signal with a control signal to generate a first punctured sequence signal, said punctured sequence signal including a control chip at said predefined sequence position having a binary value corresponding to said control signal;

generating a pseudo-noise (PN) signal corresponding to a predetermined PN binary sequence; and combining said first punctured sequence signal and said PN signal so as to provide a resultant first modulation signal.

12. The method of claim 11 wherein said step of generating a first orthogonal sequence signal includes the step of generating a first Walsh sequence.

13. The method of claim 12 wherein said selected chip at said predefined sequence position corresponds to a first chip of each of said Walsh sequences.

14. A method for transmitting a digital user information signal over a communication channel, said method comprising the steps of:

generating, in accordance with a value of said digital user information signal, a preselected Walsh sequence included within a set of orthogonal Walsh binary sequences, each of said orthogonal binary chip sequences having a selected chip of an identical binary value located at an identical predefined sequence position;

combining said preselected Walsh sequence signal with a control signal to generate a first punctured sequence signal, said punctured sequence signal including a control chip at said predefined sequence position having a binary value corresponding to said control signal;

means for generating first and second pseudorandom noise (PN) signals of a code sequence different from one another; and receiving and combining said first punctured sequence signal respectively with said first and second PN signals, and providing resultant first and second output modulation signals.

15. The method of claim 14 further comprising the steps of:

modulating said first and second output modulation signals upon a carrier signal; and transmitting said modulated carrier signal.

16. The method of claim 15 further including the step of receiving said modulated carrier signal and extracting said control signal therefrom.

17. The method of claim 16 further including the step of demodulating said modulated carrier signal using said preselected Walsh sequence.

18. The method of claim 17 wherein said step of demodulating includes the steps of:

generating a first despreading signal by replicating said first PN signal; and correlating said modulated carrier signal using said first despreading signal so as to provide a first correlated output signal.

19. The method of claim 18 wherein said step of demodulating further includes the steps of:

generating a second despreading signal by replicating said second PN signal; and correlating said modulated carrier signal using said second despreading signal so as to provide a second correlated output signal.

20. The method of claim 19 wherein said step of extracting said control signal includes the step of combining said first and second correlated output signals.

21. A digital communication system, comprising:

means for receiving an input signal and for generating, in accordance with a value of said input signal, a first orthogonal sequence signal corresponding to one of a plurality of orthogonal binary chip sequences, each of said orthogonal binary chip sequences having a selected chip of an identical binary value located at an identical predefined sequence position;

means for combining said first orthogonal sequence signal with a control signal to generate a first punctured sequence signal, said punctured sequence signal including a control chip at said predefined sequence position having a binary value corresponding to said control signal; and a transmitter for modulating a carrier signal using said punctured sequence signal, and for transmitting the resulting modulated carrier signal.

22. The system of claim 21 wherein said plurality of orthogonal binary sequences are Walsh sequences.

23. The system of claim 22 wherein said selected chip at said predefined sequence position corresponds to a first chip of each of said Walsh sequences.

24. The system of claim 23 further including a receiver for receiving said modulated carrier signal, and for extracting said control signal therefrom.

25. The system of claim 24 wherein said receiver means further includes demodulator means for demodulating said modulated carrier signal using said preselected Walsh sequence.

26. A method for communicating a digital information signal over a communication channel comprising the steps of:

generating, in accordance with a value of said digital information signal, a first orthogonal sequence signal corresponding to a selected one of a plurality of orthogonal binary chip sequences, each of said orthogonal binary chip sequences having a selected chip of common binary value located at a common predefined sequence position;

combining said first orthogonal sequence signal with a control signal to generate a first punctured sequence signal, said punctured sequence signal including a control chip at said predefined sequence position having a binary value corresponding to said control signal; and combining said first punctured sequence signal and a PN signal so as to provide a resultant first modulation signal.

27. The method of claim 26 wherein said step of generating a first orthogonal sequence signal includes the step of generating a first Walsh sequence.

28. The method of claim 27 wherein said selected chip at said predefined sequence position corresponds to a first chip of each of said Walsh sequences.

* * * * *